(No Model.) 4 Sheets—Sheet 1.
R. H. TWEDDELL, J. PLATT & J. FIELDING.
APPARATUS FOR SUSPENDING PORTABLE RIVETING MACHINES.
No. 307,353. Patented Oct. 28, 1884.
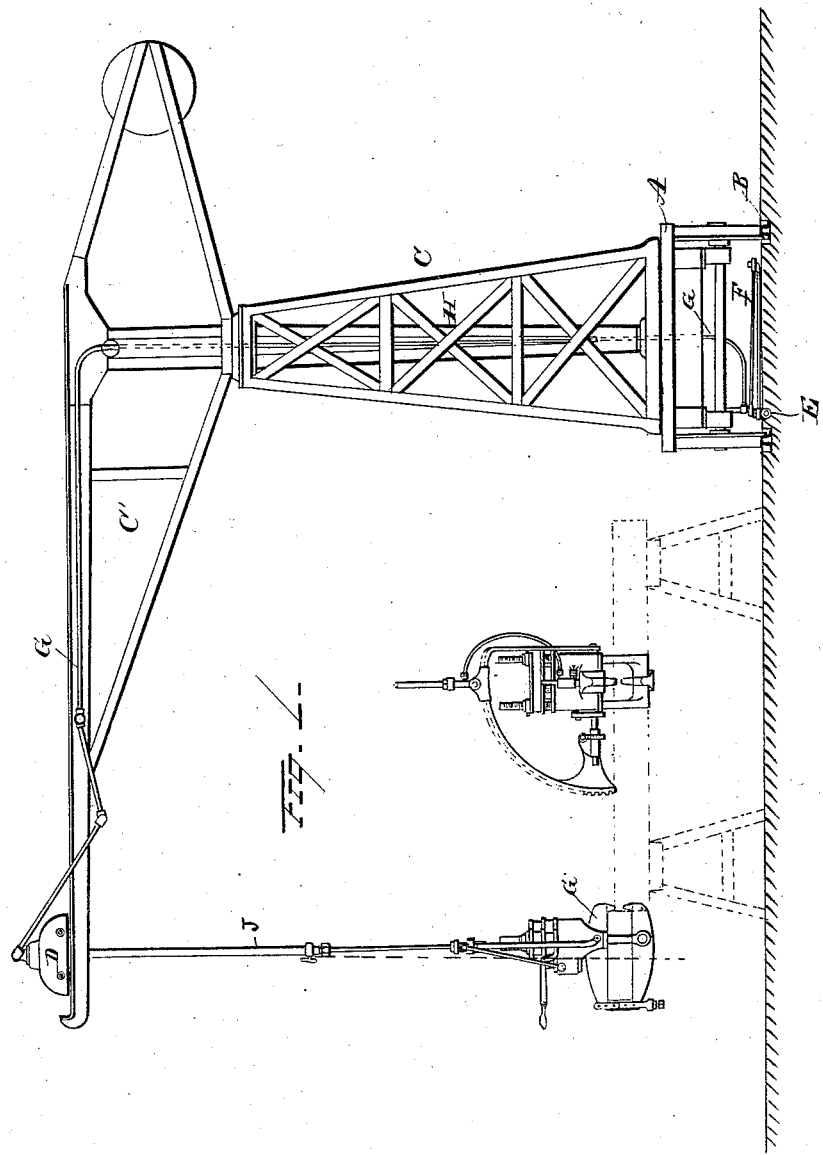
WITNESSES
Geo. F. Downing
S. G. Nottingham
INVENTOR
R. H. Tweddell
J. Platt
J. Fielding
By H. A. Seymour, Attorney

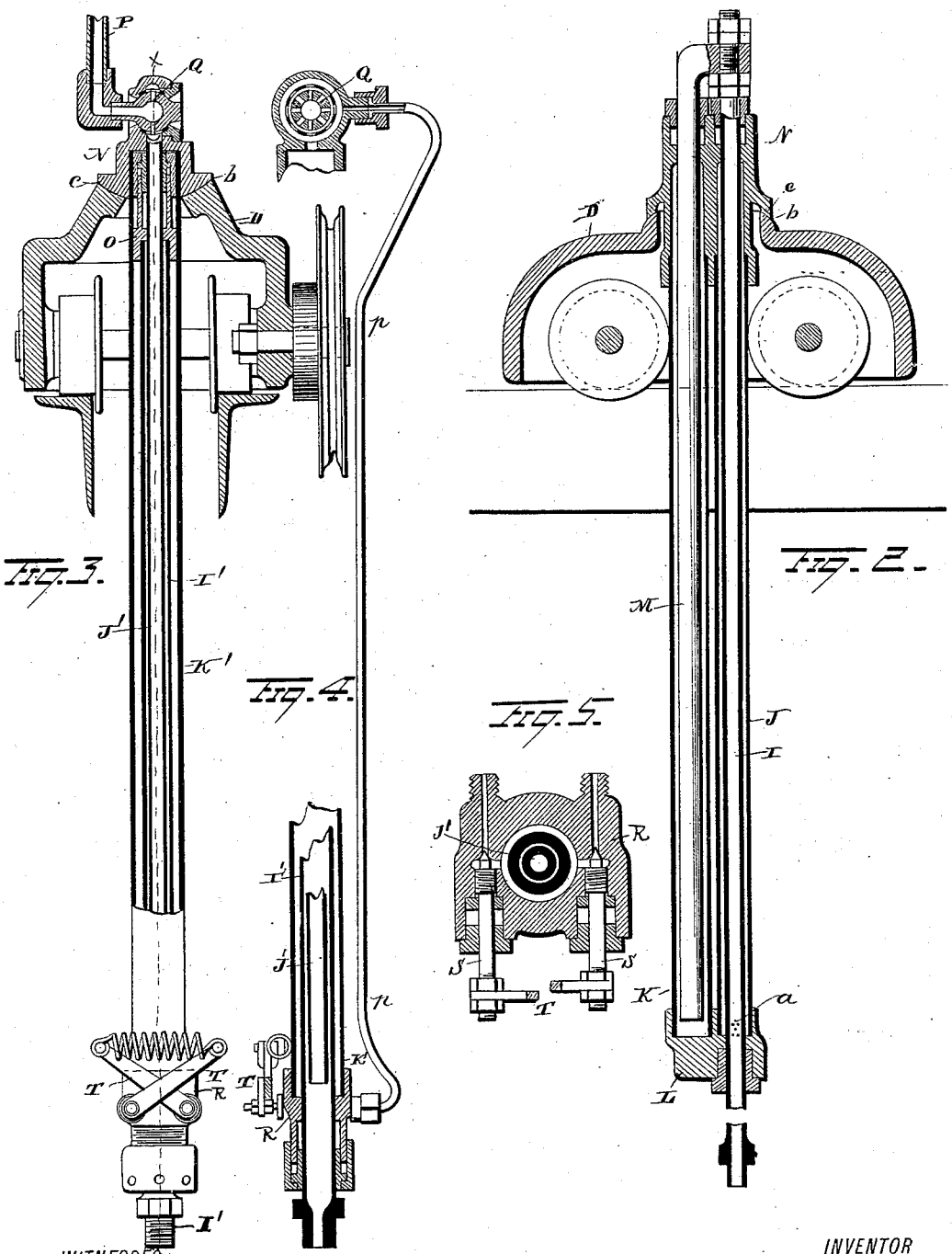

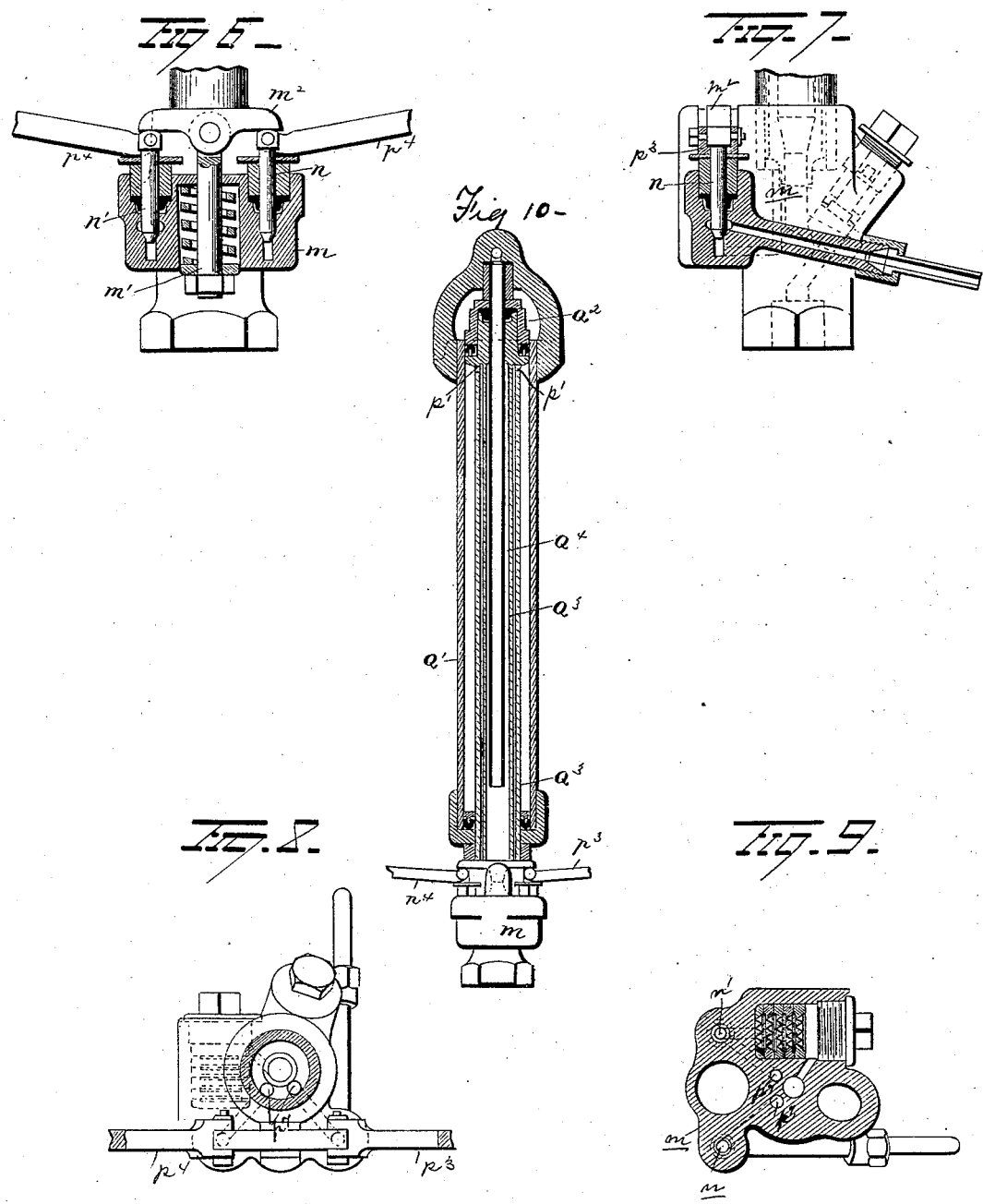

(No Model.) 4 Sheets—Sheet 4.
R. H. TWEDDELL, J. PLATT & J. FIELDING.
APPARATUS FOR SUSPENDING PORTABLE RIVETING MACHINES.
No. 307,353. Patented Oct. 28, 1884.
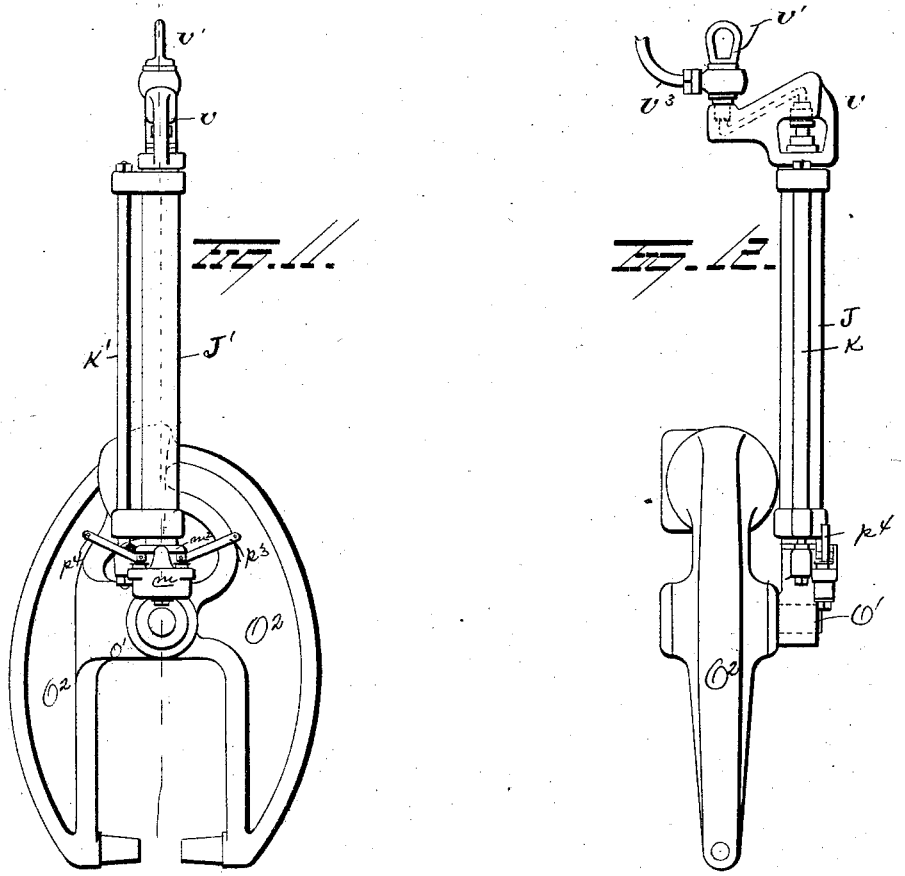

UNITED STATES PATENT OFFICE.

RALPH HART TWEDDELL, OF WESTMINSTER, COUNTY OF MIDDLESEX, AND JAMES PLATT AND JOHN FIELDING, OF GLOUCESTER, COUNTY OF GLOUCESTER, ENGLAND.

APPARATUS FOR SUSPENDING PORTABLE RIVETING-MACHINES.

SPECIFICATION forming part of Letters Patent No. 307,353, dated October 28, 1884.

Application filed May 13, 1884. (No model.) Patented in England February 27, 1878, No. 797; in France September 7, 1878, No. 127,589, and in Belgium October 7, 1878, No. 46,325.

*To all whom it may concern:*

Be it known that we, RALPH HART TWEDDELL, of Westminster, in the county of Middlesex, and JAMES PLATT and JOHN FIELDING, of Gloucester, in the county of Gloucester, and country of England, have invented certain new and useful Improvements in Apparatus for Suspending Portable Riveting-Machines; and we do hereby declare the following to be a full, clear, and exact description of the invention, such as will enable others skilled in the art to which it appertains to make and use the same.

Our invention relates to an improvement in devices for suspending portable riveting-machines, the object of the same being to provide means for vertically adjusting the machine, whereby it can be raised and lowered and held at any desired elevation to accommodate itself to the work; and with this end in view our invention consists in suspending the riveter by means of telescopic pipes, which latter are provided with valves for admitting and discharging the working-fluid. Our invention further consists in the parts and combinations of parts, as will be more fully described, and pointed out in the claims.

In the accompanying drawings, Figure 1 is a view in side elevation of our improved lifting device as applied to a riveting-machine. Fig. 2 is a vertical sectional view of the telescopic pipes. Fig. 3 is a modified form of the same, showing the lower end thereof in elevation. Fig. 4 is a sectional view taken on the line $x$ $x$ of Fig. 3. Fig. 5 is an enlarged view in vertical section of the valve-box, and Figs. 6, 7, 8, 9, 10, 11, and 12 are views of modified structures.

A represents a truck adapted to run on a track, B, and provided with the crane C C', the latter provided with a trackway on which the crab D moves.

E is a water-supply pipe, to which the jointed pipe F is connected. This jointed connecting-pipe is connected at its upper end to the pipe G, which latter passes upwardly through the hollow standard H, and then curves toward the crab D. This pipe G is also jointed near its outer end to enable the crab to be moved back and forth on the part C' of the crane without interference. By means of the jointed pipe F, pipe G, and the crane, the riveter G', which can be of any approved construction, can be moved from place to place to accommodate itself to the work, and by means of the telescopic pipes, to be hereinafter described, it can be vertically adjusted for the same purpose. The pipe G is connected at its outer end to the pipe I, the upper end of which latter passes through the crab D. This pipe I, which is also the supply-pipe, works telescopically within the outer pipe, J, and communicates by holes $a$ with the annular space between the two pipes, in which space the working-fluid is supplied.

K is an external pipe, the upper end of which is rigidly secured to a casting resting on the crab-frame D, while the lower end thereof is secured to the box L, to which the lower end of the pipe J is secured. The pipe K can also be supplied with the working-fluid from the annular space between the pipes I and J, or it can have the fluid discharged therefrom, the supply and discharge being governed by suitable valves, similar to that shown in Figs. 3, 4, and 5, which latter are located in the box L. In the pipe K works the plunger M, which latter is connected at the top above the crab D to the pipe I. When the working-fluid is admitted to the pipe K, the plunger M is forced upward, and thereby raises the pipe I and the riveter, which latter is suspended from the lower end of the pipe, and, conversely, by discharging the contents of the pipe K, the pipe I and riveter are lowered. The pipe I is adapted to carry the working-fluid to the riveter, which latter can be a portable hydraulic riveter of any suitable structure. The crab-frame D is centrally perforated for the passage of the box, and is provided with the conical bearing $b$, on which the bearing $c$ of the box N rests and turns.

A modified form of this suspending-gear is shown in Fig. 3, which is a vertical section with the lower part in elevation, this lower part and the upper part being shown in cross-section in Fig. 4, and the valve-box at the bottom being shown in horizontal section to an enlarged scale in Fig. 5. In this modification the pipe K', which corresponds to the pipe K of Fig. 2, instead of being at the side of the telescopic pipe, incloses it, and the suspending-pipe I', that corresponds with the pipe I of same figure, instead of being within the pipe J', incloses it. This modified structure is mounted on the crab D, and with the outer pipe, K, is rigidly secured to the box N. The suspending-pipe I' is situated within this cylinder, and is provided at its upper end with the piston O, which latter is adapted to move vertically within the pipe K. This pipe I' carries the riveter and conveys the fluid for actuating the same. This piston is provided with a central opening for the passage of the supply-pipe J', which latter terminates within the pipe I'. The supply-pipe P is connected to the inner pipe, J', through a spherical joint, Q, and it is to be understood that a similar connection for the supply is employed in the arrangement shown in Fig. 2. This joint box or casing is connected to the pipe $p$, the lower end of which is secured to the valve-box R, for the purpose of supplying water to the pipe K. At the bottom of pipe K is a valve-box, R, containing screw supply and discharge valves S, worked by the levers T, so as to admit the working-fluid supplied by the pipe $p$ to the annular space within the pipe K or to discharge the fluid therefrom. When it is admitted to this space, the pressure acting on the annular piston O raises the pipe I', and with it the machine suspended by it, and, conversely, when the pressure in the annular space is relieved, the pipe and machine descend, the pipe I' being free to move in the box R.

In Figs. 6, 7, 8, 9, and 10 we have shown a slightly-modified arrangement of parts for producing precisely the same results. In this construction the valve-box $m$ is provided with a sliding bolt, $m'$, with a helical spring drawing it down, and to the upper end of this bolt we joint a sway-beam, $m^2$, the ends of which bear on the stems of the valves $n$ $n'$, which are arranged one on each side of the central bolt, $m'$. To each valve-stem we joint, respectively, the ends of levers $p^3$ $p^4$, each of which has a swell or protuberance on its lower side, that bears on a plate on the valve-box. The valves, being round, can be turned in their seatings, and the levers $p^3$ $p^4$, jointed to them, may therefore extend outward from them in any convenient direction. By pushing or drawing down the outer end of either lever, such as $p^4$, it works on its lower protuberance as a fulcrum, raising the valve $n'$ from its seat, and bearing up one end of the sway-beam $m^2$ in opposition to the spring.

The telescopic tube, to the lower end of which the valve-box is secured, as shown in Fig. 10, contains passages for the working-fluid, and a plunger acted on by the fluid-pressure for raising and lowering the riveter suspended from the valve-box. The outer tube, Q', which is suspended by a crane or otherwise, forms a cylinder, in which works the piston $Q^2$. This piston has a tubular stem, $Q^3$, which works through packing at the bottom of the tube, and is attached to the valve-box. The stem $Q^3$ is a double tube, having within it an annular space, communicating by passages $p^7$ at the bottom with the two valves $n$ $n'$, as shown in Fig. 9, and having at its upper end lateral apertures $p'$ into the annular space between Q' and $Q^3$. Within the tube $Q^3$ is an inner tube, $Q^4$, open at the bottom, and at the top attached to the head that carries the tube Q', passing through packing in the piston $Q^2$. When one of the valves $n$ $n'$ is opened, fluid under pressure enters the tube Q', and, acting on the piston $Q^2$, causes it to ascend, raising the riveter attached to it. When the other valve is opened, the piston $Q^2$ is relieved from pressure, and it descends, lowering the riveter.

In Figs. 11 and 12 we have shown the telescopic lift shown in Fig. 2 secured directly to a trunnion, to which latter is also journaled a portable riveting-machine. This riveter is adapted to be adjustably secured to the trunnion O', and consequently can only be turned in two planes. The upper end of the lift is secured to the metal cap V, which latter is in turn secured to the swivel-hook V', resting over the center of gravity of the riveter $O^2$. This hook and the pipe $V^3$ form a passage-way for the pressure-supply.

We do not claim, broadly, in this application a riveting-machine suspended by the supply-pipe; neither do we claim, broadly, a telescoping lift for elevating the riveter, as these features are shown, described, and claimed, respectively, in our pending application numbered 134,962, and application of John Fielding, numbered 128,530.

Having fully described our invention, what we claim as new, and desire to secure by Letters Patent, is—

1. The combination, with a portable riveting-machine, of a telescoping pipe for elevating the riveter and conveying the actuating-fluid thereto.

2. In a device for suspending a portable riveting-machine, the combination, with a fluid-supply pipe having a riveting-machine suspended therefrom, of a pipe and a piston connected to said supply-pipe, substantially as set forth.

3. A device for elevating and lowering a portable riveting-machine, consisting, essentially, in a supply-pipe supporting the riveting-machine, a pipe, a piston working in the latter pipe and connected with the supporting-pipe, and valves for regulating the admission and discharge of the working-fluid, all of the above parts combined substantially as set forth.

4. In a device for suspending portable riveting-machines, the combination, with a crane and a crab, of a telescoping pipe connected to said crab, substantially as set forth.

5. The combination, with a crane, crab, and jointed pipe, of telescoping pipes connected to the jointed pipe and crab, and a portable riveting-machine suspended from one of said pipes, substantially as set forth.

6. The combination of the crab, pipe P, provided with the spherical joint, the pipe I and inclosing-pipe, and a piston connected with said pipe I, whereby the latter can be elevated and lowered, substantially as set forth.

7. The combination of the crab, pipes I and J, pipe K, and piston M, substantially as set forth.

In testimony whereof I have signed this specification in the presence of two subscribing witnesses.

RALPH HART TWEDDELL.

Witnesses:
 H. G. SCOTT,
 WM. BAILEY.

In testimony whereof we have signed this specification in the presence of two subscribing witnesses.

JAMES PLATT.
JOHN FIELDING.

Witnesses:
 JOHN A. POPE,
 H. CADENNE.